United States Patent [19]

Mislin

[11] Patent Number: 4,728,464
[45] Date of Patent: Mar. 1, 1988

[54] 1-AMINO-4-(3'-PHENYLSULPHONYL-AMINOPHENYLAMINO) ANTHRAQUINONE-2-SULPHONIC ACIDS USEFUL AS ANIONIC DYESTUFFS

[75] Inventor: Roland Mislin, Village-Neuf, France

[73] Assignee: Sandoz Ltd., Basel, Switzerland

[21] Appl. No.: 486,033

[22] Filed: Apr. 18, 1983

[30] Foreign Application Priority Data

Apr. 22, 1982 [DE] Fed. Rep. of Germany ....... 3214963

[51] Int. Cl.⁴ .............................. C09B 1/26; D06P 1/20
[52] U.S. Cl. .................................... 260/374; 260/372; 260/378
[58] Field of Search .......................... 260/378; 534/374

[56] References Cited
FOREIGN PATENT DOCUMENTS 582317 12/1959 Belgium ............................. 260/378
1598651 9/1981 United Kingdom ............... 260/378

Primary Examiner—Floyd D. Higel
Attorney, Agent, or Firm—Gerald D. Sharkin; Richard E. Vila; Thomas C. Doyle

[57] ABSTRACT

Compounds of formula I

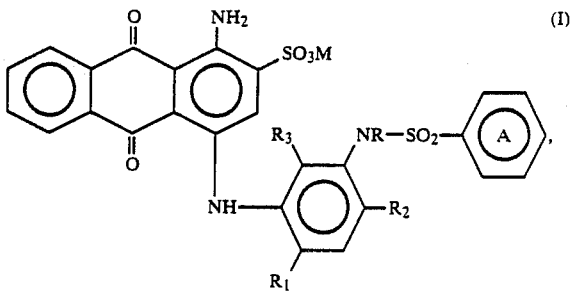

in which R is hydrogen, methyl or ethyl,
$R_1$ is methyl, ethyl, $C_{1-4}$alkoxy or halogen
$R_2$ is hydrogen, methyl or ethyl
$R_3$ is hydrogen, methyl or ethyl
M is hydrogen or one equivalent of a cation and
ring A may be unsubstituted or substituted by up to three substituents selected from $C_{1-4}$alkyl, $C_{1-4}$alkoxy, halogen and $C_{2-4}$acylamino are useful anionic dyestuffs having superior alkali resistance for the dyeing and printing of natural and synthetic polyamides, especially nylon.

15 Claims, No Drawings

1-AMINO-4-(3'-PHENYLSULPHONYL-AMINO-PHENYLAMINO) ANTHRAQUINONE-2-SULPHONIC ACIDS USEFUL AS ANIONIC DYESTUFFS

This invention relates to novel anthraquinone compounds, which are useful as anionic dyestuffs.

The invention provides compounds of formula I

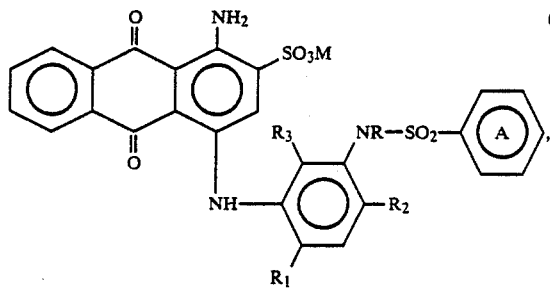

in which R is hydrogen, methyl or ethyl,
$R_1$ is methyl, ethyl, $C_{1-4}$alkoxy or halogen
$R_2$ is hydrogen, methyl or ethyl
$R_3$ is hydrogen, methyl or ethyl
M is hydrogen or one equivalent of a cation and
ring A may be unsubstituted or substituted by up to three substituents selected from $C_{1-4}$alkyl, $C_{1-4}$alkoxy, halogen and $C_{2-4}$acylamino.

By the term 'halogen' is meant fluorine, chlorine and bromine, preferably fluorine and chlorine, particularly chlorine. Alkyl and alkoxy groups of 3–4 carbon atoms may be either straight chain or branched, but in general the $C_1$ and $C_2$ alkyl and alkoxy groups are preferred. R, $R_1$, $R_2$ and $R_3$ as alkyl are preferably methyl.

R is preferably hydrogen. $R_1$ is preferably $R_1'$ where $R_1'$ is methyl, methoxy, ethoxy, fluorine or chlorine, more preferably $R_1''$ where $R_1''$ is methyl, methoxy, ethoxy or chlorine, particularly methyl. $R_2$ and $R_3$ are preferably $R_2'$ and $R_3'$ where $R_2'$ and $R_3'$ are, independently, hydrogen or methyl, more preferably hydrogen.

M is preferably hydrogen or one equivalent of a non-chromophoric cation such as is conventional in anionic dyestuffs, particularly a monovalent cation, e.g. cations of alkali metals and unsubstituted or substituted ammonium cations. Examples of substituted ammonium cations include mono-, di- or tri-($C_{1-4}$alkyl)ammonium; mono-, di- or tri-($C_{2-4}$alkanol)ammonium (examples of alkanol groups being 2-hydroxyethyl and 1-hydroxy-2-propyl); and pyridinium. More preferably M is a hydrogen or an alkali metal or unsubstituted ammonium cation, particularly sodium ion.

Preferably, when ring A is substituted with alkoxy, halogen or $C_{2-4}$acylamino (preferably acetylamino), not more than one substituent selected from this group is present. Preferred substituents are methyl, ethyl, chlorine and fluorine, preferably in the positions ortho and-/or para to the sulphonyl group. Where a single substituent is present, it is preferably in the para position.

Preferred compounds of formula I are those of formula I'

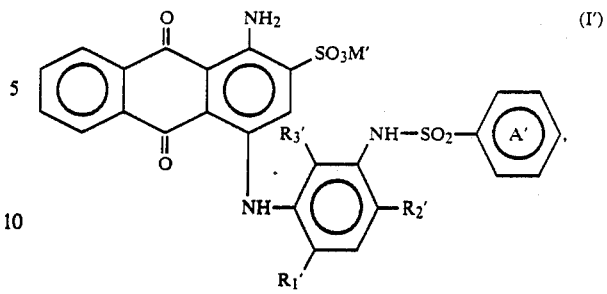

in which
$R_1'$, $R_2'$ and $R_3'$ are as defined above,
M' is hydrogen or a monovalent cation and
ring A' is unsubstituted or substituted with up to three substituents selected from methyl, ethyl, chlorine and fluorine, provided that not more than one halogen substituent is present.

More preferred compounds are those of formula I''

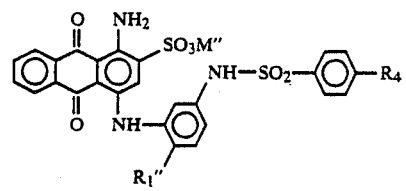

in which
$R_1''$ is as defined above,
M'' is hydrogen or an alkali metal or unsubstituted ammonium cation and
$R_4$ is hydrogen, chlorine or methyl.

Compounds of formula I may be prepared by reacting a sulphonic acid halide of formula II

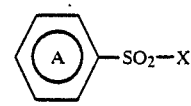

where X is chlorine or bromine, preferably chlorine, with an amine of formula III

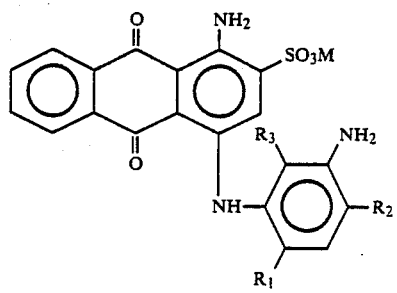

and, when R is methyl or ethyl, N-alkylating the amidation production originally obtained.

The amidation reaction is carried out in conventional manner in a solvent, preferably a mixture of water and an organic solvent, e.g. water/acetone or water/dimethylformamide, preferably between room temperature and 60° C. and at a pH between 5 and 11. The reaction is preferably carried out in the presence of a base to neutralise acid produced in the reaction; suitable bases include alkali metal carbonates, bicarbonates and hydroxides, or tertiary bases e.g. pyridine bases. To reduce the possibility of hydrolysis of the acid halide II, the reaction is preferably run under as mild conditions as possible, i.e. at temperatures close to room temperature and pH values no higher than 10.

N-Alkylation of compounds of formula I in which R is hydrogen is achieved using conventional alkylating agents for example alkyl chlorides, bromides or iodides, dialkyl sulphates or alkyl tosylates. Preferably dimethyl sulphate or diethyl sulphate is used. Conventional conditions are employed, e.g. in an aqueous or aqueous/organic solvent system at 50°–80° C., pH 8–10.

The products may be isolated and if desired purified by known techniques.

Amines of formula III are known or may be produced by known methods, for example by reacting a compound of formula V with an amine of formula VI to give a compound of formula IV

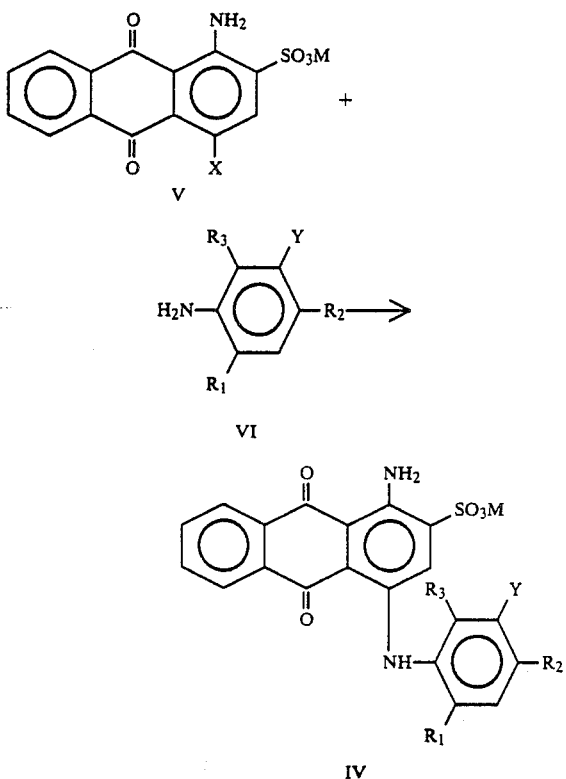

in which Y is ($C_{2-4}$acyl)amino or nitro, followed by hydrolysis or reduction, respectively, to convert the group Y to a primary amino group.

The reaction between V and VI is a conventional dehydrohalogenation reaction, which is preferably carried out in the presence of a basic acid-acceptor and of a catalyst e.g. cuprous chloride. Hydrolysis of the acylamino compound may be carried out under acid conditions, e.g. with hydrochloric acid in an aqueous/organic solvent system. Reduction of the nitro compound may be a catalytic hydrogenation or other conventional process. Compounds of formula V and VI are known.

The compounds of formula I are reddish-blue to greenish-blue dyestuffs, and their solutions in colourless solvents or their dyeings on neutral white substrates give shades corresponding to shades no. 13–15 (bright) on the "Hue Indication Chart" in the 3rd Edition of the Colour Index. They absorb light primarily in the yellow to orange region of the visible spectrum.

The compounds of formula I in which $R_3$ is hydrogen and $R_1$ is halogen or alkyl are brilliant slightly reddish- to neutral-blue dyestuffs, while those in which $R_3$ is hydrogen and $R_1$ is $C_{1-4}$-alkoxy are brilliant greenish-blue and those in which both $R_1$ and $R_3$ are alkyl are brilliant reddish-blue in shade.

The compounds of the invention are useful for dyeing or printing anionic dyeable substrates, in particular leather and textile substrates consisting of or comprising natural or synthetic polyamides, especially wool and nylon. Preferred substrates are synthetic polyamides, particularly nylon 66 and nylon 6. Application to the substrate may be effected in accordance with known methods, for example exhaust dyeing, padding or printing.

The dyestuffs of the invention are neutral exhausting dyestuffs and have remarkably high alkali resistance. They are therefore particularly suitable for dyeing processes in which alkaline conditions arise, particularly for exhaust dyeing processes in which the bath starts off alkaline and in the course of the dyeing process is gradually adjusted to acid pH values, e.g. from pH 10 to pH 4. Such processes are used particularly in the dyeing of nylon to prevent the superficial and uneven exhaust on to the fibres which would occur on using dyestuffs with high fibre affinity under acid conditions. By using initially alkaline conditions under which the affinity of the dye for the fibre is low, the dyebath can penetrate well into all parts of the substrate, and then exhaust levelly on to the substrate as the pH is reduced. This is particularly important for thick substrates and those whose fibres are tightly pressed together, for example cross spools, felt, satin, tufted goods, and particularly carpets. For this reason the dyestuffs of the invention are particularly suitable for dyeing such substrates.

The dyestuffs according to the invention have good build-up on the above substrates, and under mild acid conditions are exhausted practically quantitatively on the substrate. They are also unaffected by colour corrections, even if carried out under alkaline conditions. Furthermore they have optional properties for use in "space dyeing".

The dyestuff, particularly in the form of their ammonium or alkali metal salts, have good solubility in water, and allow the preparation of highly concentrated stock solutions and of stable printing pastes having a high dyestuff concentration, e.g. of 5–50 g dyestuff (as salt, preferably sodium salt)/kg paste, or even up to 80 g/kg. The dyestuffs may also be used in solid form, either as prepared or after purification, or in compositions with conventional excipients such as blending agents, solubilising agents and dispersing agents.

Dyeings obtained using the dyestuffs of the invention are obtained with good yield and high brightness. They have generally good fastness properties, particularly wet fastness and light fastness. Printing pastes containing the dyes can give very sharp prints in deep shades.

The dyestuffs are suitable for combination dyeing with other anionic dyestuffs of similar properties, and do not give rise to catalytic fading effects. Particularly suitable dyes for combination dyeing together with the dyestuffs of the invention are those having yellow, orange and red shades.

The following Examples, in which all parts and percentages are by weight, illustrate the invention.

EXAMPLE 1

(a) 38.2 Parts 1-amino-4-bromoanthraquinone-2-sulphonic acid are dissolved in 200 parts water/100 parts i-propanol and the pH adjusted to 8.5-9.0 with sodium carbonate. After addition of 18 parts 4-acetylamino-2-aminotoluene the mixture is warmed to 80° C. and treated with 1 part cuprous chloride and 12 parts sodium carbonate. After 4 hours the reaction is over. Finally 25 parts 30% hydrochloric acid are added to the reaction mixture, which is then heated to reflux. After 18 hours the suspension is cooled to room temperature, filtered and washed with 1% hydrochloric acid, to give 1-amino-4-(5'-amino-2'-methylphenylamino)-anthraquinone-2-sulphonic acid.

(b) 21.4 Parts of the product of Example 1(a) are heated to 50° C. in 200 parts water. The pH is adjusted to 8-8.5 by the addition of 10% sodium carbonate solution, and 10 parts p-toluenesulphonyl chloride are added in small portions, the pH being kept in the above range by further additions of soda solution. When no further starting material can be detected by thin layer chromatography, the dyestuff is isolated by salting out with NaCl. The product, of formula

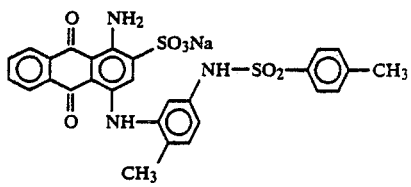

gives on wool and nylon bright neutral blue dyeings having good wet- and light fastness.

The corresponding free acid form may be obtained by acidification of the reaction product, and neutralisation with ammonia or an amine gives the corresponding ammonium or substituted ammonium salt.

EXAMPLE 2

The product of Example 1(b) (144 parts) is suspended in 1100 parts water, the pH is adjusted to 10 with caustic soda and the mixture is warmed to 60° until the dyestuff dissolves. 35 Parts of dimethyl sulphate are added dropwise over 30 minutes, the temperature and pH being held at the above values. Finally the mixture is made strongly acid by addition of concentrated hydrochloric acid, and stirred for 30 minutes. The product, of formula

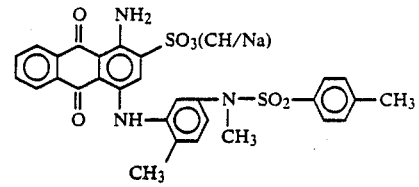

precipitates and is collected by filtration in 90% yield. The product, which is a mixture of the free acid and sodium salt forms, dyes wool and nylon in bright neutral blue shades.

EXAMPLES 3-13

In analogous manner to Examples 1 and 2, dyestuffs of the formula

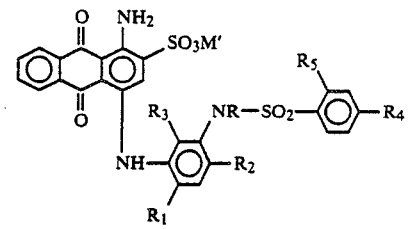

can be obtained, the significances if the groups, R, $R_1$, $R_2$, $R_3$, $R_4$, $R_5$ and M', as well as the shade of dyeings on nylon, being given in Table I.

TABLE I

| Ex. No. | R | $R_1$ | $R_2$ | $R_3$ | $R_4$ | $R_5$ | M' | shade |
|---|---|---|---|---|---|---|---|---|
| 3 | H | —OC$_2$H$_5$ | H | H | H | H | Li | greenish blue |
| 4 | H | —CH$_3$ | H | H | H | H | Na | neutral blue |
| 5 | H | —CH$_3$ | H | H | —CH$_3$ | —CH$_3$ | Na | neutral blue |
| 6 | H | —CH$_3$ | H | H | —NHCOCH$_3$ | H | K | neutral blue |
| 7 | H | Cl | H | H | —CH$_3$ | H | Na | neutral blue |
| 8 | H | —OCH$_3$ | H | H | —CH$_3$ | H | NH$_4$ | greenish blue |
| 9 | H | —CH$_3$ | —CH$_3$ | —CH$_3$ | H | H | Li | reddish blue |
| 10 | H | —CH$_3$ | —CH$_3$ | —CH$_3$ | —CH$_3$ | H | Li | reddish blue |
| 11 | H | —CH$_3$ | H | —CH$_3$ | —CH$_3$ | H | Na | reddish blue |
| 12 | H | —CH$_3$ | H | H | Cl | H | Na | neutral blue |
| 13 | —C$_2$H$_5$ | —CH$_3$ | H | H | H | H | Li | neutral blue |

APPLICATION EXAMPLES

In the following Examples the dyestuffs are used in the following forms:

| | |
|---|---|
| Dyestuffs of Examples 1-13: | 40% dyestuff, 60% dextrin |
| C.I. Acid Orange 127: | 33.8% dyestuff, 66.2% dextrin |
| C.I. Acid Orange 67: | 83% dyestuff, 17% Glaubers salt |
| C.I. Acid Red 299: | 38% dyestuff, 62% dextrin. |

In Application Examples A & B, the quantity of dye used is calculated on the basis of the active substance, in Examples C-G on the composition as given above.

APPLICATION EXAMPLE A

The dyestuff of Example 1(b) (0.5 parts) is dissolved in 1000 parts water, together with 0.5 parts borax, giving a solution of pH 9. To this dyebath is added nylon yarn (30 parts) and the bath is heated from 40° C. to 98° C. over 30 minutes. Acetic acid is then added slowly, so that the pH falls from 9 to 5 over 20 minutes. To complete the exhaustion of the dyestuff, a further 10 parts acetic acid are then added. After 30 minutes dwell at 98°

C. the bath is cooled to 70° C. and drained. The dyed yarn is rinsed and dried, giving a level, fast, bright blue dyeing.

APPLICATION EXAMPLE B

Example A is repeated except that 2 parts butyrolactone are present in the dyebath, and no acetic acid is added. Good results are obtained.

APPLICATION EXAMPLE C

In 6000 parts water at 40° C. are dissolved 0.27 parts of the product of Example 1(b), 1.31 parts C.I. Acid Orange 127, 0.16 parts C.I. Acid Red 299 and 4 parts ammonium sulphate. To the dyebath are added 100 parts nylon yarn. The bath is then heated to the boil over 30 minutes and held at the boil for 1 hour. The yarn is finally rinsed and dried, giving a brown dyeing with very good wet- and light-fastness properties.

APPLICATION EXAMPLE D (Simulated correction of depth)

The same dye mixture as in Example C is dissolved in 6000 parts of alkaline works water (pH 8-9) without addition of ammonium sulphate. Dyeing of 100 parts of nylon yarn is carried out under the conditions of Example C, and a sample is removed and found to have too light a shade. To correct this, 4 parts ammonium sulphate are added, and dyeing at the boil continued for a further hour. After rinsing and drying, a brown dyeing with good wet- and light fastness is obtained.

APPLICATION EXAMPLE E

100 Parts of nylon yarn are dyed under the conditions of Example C, but using the following mixture of dyes:
0.3 parts C.I. Acid Orange 67
0.22 parts C.I. Acid Red 299
0.65 parts Dyestuff of Example 1(b).

A dark olive dyeing with good wet- and light fastness is obtained.

APPLICATION EXAMPLE F (simulated correction of depth)

After dyeing as in Example E, it is determined that (because of a calculation error), too deep a dyeing has been produced. To correct this, the dyed yarn is re-immersed in a bath containing only 0.5 g/l borax, and held at 98° until the desired degree of lightening is obtained (60 minutes). The resulting dyeing is lighter in depth but of exactly the same hue as that of Example E, and has the same fastness properties.

APPLICATION EXAMPLE G

65 Parts of the product of Example 1(b) are made into a dough with 25 parts thiodiethylene glycol and 25 parts diethylene glycol monobutyl ether, then dissolved in 265 parts boiling water. The solution is stirred into 500 parts of 9% aqueous corn starch ether thickener, and 60 parts thiourea and 60 parts ammonium tartrate are added with stirring until fully dissolved.

The resulting printing paste is applied by conventional printing process to untextured polyamide fabric, and the resulting prints dried and fixed in saturated steam for 20 minutes at 102°. The fixed prints are washed cold then warm and finally rinsed lukewarm then cold. The resulting bright blue prints are sharp and have very good light- and wet fastness.

By analogy, the dyestuffs of Examples 2-13 may be used in any of Application Examples A-G, similar good properties being obtained.

What is claimed is:

1. A compound of the formula

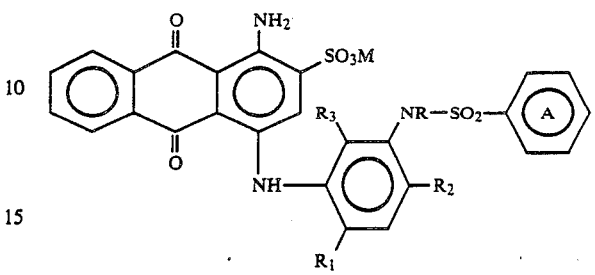

in which

R is hydrogen, methyl, or ethyl, $R_1$ is methyl, ethyl, $C_{1-4}$alkoxy, fluorine, chlorine or bromine $R_2$ is hydrogen, methyl or ethyl, $R_3$ is hydrogen, methyl or ethyl, provided that at least one of $R_2$ and $R_3$ is hydrogen, M is hydrogen or a cation and ring A is unsubstituted or substituted by up to three substitutents selected from $C_{1-4}$alkyl, $C_{1-4}$-alkoxy, fluorine, chlorine, bromine and acetylamino.

2. A compound according to claim 1 in which R is hydrogen.

3. A compound according to claim 2 of the formula

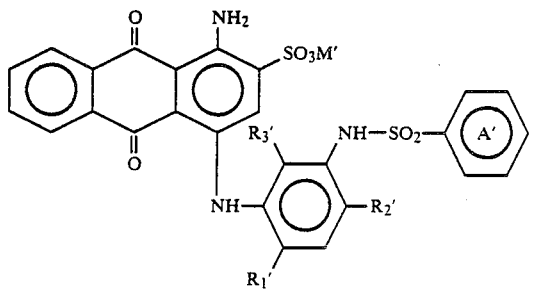

in which $R_1'$ is methyl, methoxy, ethoxy, fluorine or chlorine $R_2'$ and $R_3'$ independently are hydrogen or methyl $M'$ is hydrogen or a monovalent cation and ring A' is unsubstituted or substituted with up to three substituents selected from methyl, ethyl, chlorine and fluorine, provided that not more than one halogen substituent is present.

4. A compound according to claim 3 of the formula

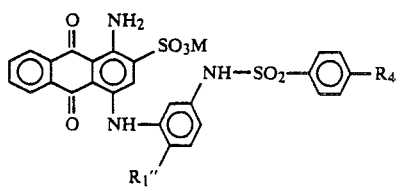

in which $R_1''$ is methyl, methoxy, ethoxy or chlorine

M is a member selected from the group consisting of hydrogen, alkali metals, unsubstituted ammonium, mono-, di- and tri-($C_{1-4}$alkyl)ammonium, mono-, di- and tri-($C_{2-4}$alkanol)ammonium and pyridinium and $R_4$ is hydrogen, chlorine or methyl.

5. A compound according to claim 4 of the formula

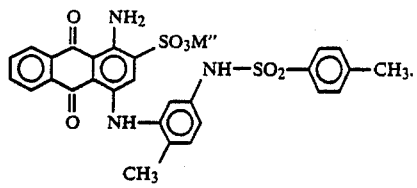

6. The compound according to claim 5 in which M" is sodium ion.

7. A compound according to claim 1 wherein M is a member selected from the group consisting of hydrogen, alkali metals, unsubstituted ammonium, mono-, di- and tri-($C_{1-4}$alkyl)ammonium, mono-, di- and tri-($C_{2-4}$alkanol)ammonium and pyridinium.

8. A compound according to claim 2 wherein M is a member selected from the group consisting of hydrogen, alkali metals, unsubstituted ammonium, mono-, di- and tri-($C_{1-4}$alkyl)ammonium, mono-, di- and tri-($C_{2-4}$alkanol)ammonium and pyridinium.

9. A compound according to claim 1 wherein not more than one substituent selected from the group consisting of alkoxy, fluorine, chlorine, bromine and acetylamino is present on the ring A.

10. A compound according to claim 2 wherein not more than one substituent selected from the group consisting of alkoxy, fluorine, chlorine, bromine and acetylamino is present on the ring A.

11. A compound according to claim 7 wherein not more than one substituent selected from the group consisting of alkoxy, fluorine, chlorine, bromine and acetylamino is present on the ring A.

12. A compound according to claim 1 wherein $R_2$ and $R_3$ are both hydrogen.

13. A compound according to claim 1 wherein $R_1$ is methyl and $R_2$ and $R_3$, independently, are hydrogen or methyl.

14. A compound according to claim 2 wherein $R_1$ is methyl and $R_2$ and $R_3$ are hydrogen.

15. A compound according to claim 4 wherein $R_1''$ is methyl.

* * * * *